United States Patent [19]

Hararat-Tehrani

[11] Patent Number: 5,085,017
[45] Date of Patent: Feb. 4, 1992

[54] DECOMPRESSION PANEL FOR A SEPARATION DEVICE IN AN AIRCRAFT

[75] Inventor: Mohammad Hararat-Tehrani, Bremen, Fed. Rep. of Germany

[73] Assignee: Deutsche Airbus GmbH, Hamburg, Fed. Rep. of Germany

[21] Appl. No.: 646,888

[22] Filed: Jan. 28, 1991

[30] Foreign Application Priority Data

Jan. 27, 1990 [DE] Fed. Rep. of Germany ....... 4002447

[51] Int. Cl.$^5$ ............................................... B64C 1/14
[52] U.S. Cl. ...................................... 52/1; 244/118.5; 49/141
[58] Field of Search ............................... 49/141; 52/1; 244/118.5, 121, 129.1, 129.4

[56] References Cited

U.S. PATENT DOCUMENTS 3,571,977 3/1971 Abeel ..................................... 49/141
4,899,960 2/1990 Hararat-Tehrani et al. .... 244/129.4

Primary Examiner—Richard E. Chilcot, Jr.
Assistant Examiner—Wynn Wood
Attorney, Agent, or Firm—W. G. Fasse

[57] ABSTRACT

Decompression panels of this type are used in separation devices such as wall or floor sections which separate a passenger compartment from a freight compartment in an aircraft. For a decompression without damage to the respective wall or floor section, it is necessary to cover or close an opening in the wall or floor section by a panel secured to a rim of the opening by frangible mounting elements that break away in response to a decompression which may be of the blow-in or blow-out type. In a blow-in situation one panel is removed to form an opening. Two panels interconnected with each other are removed in a blow-out situation. In both instances frangible mounting elements break and permit opening a decompression hole in the separation device. All the frangible mounting elements are of identical construction. The arrangement of the frangible mounting elements on one side or on the opposite side of a panel section permits the panel release in the respective direction.

14 Claims, 2 Drawing Sheets

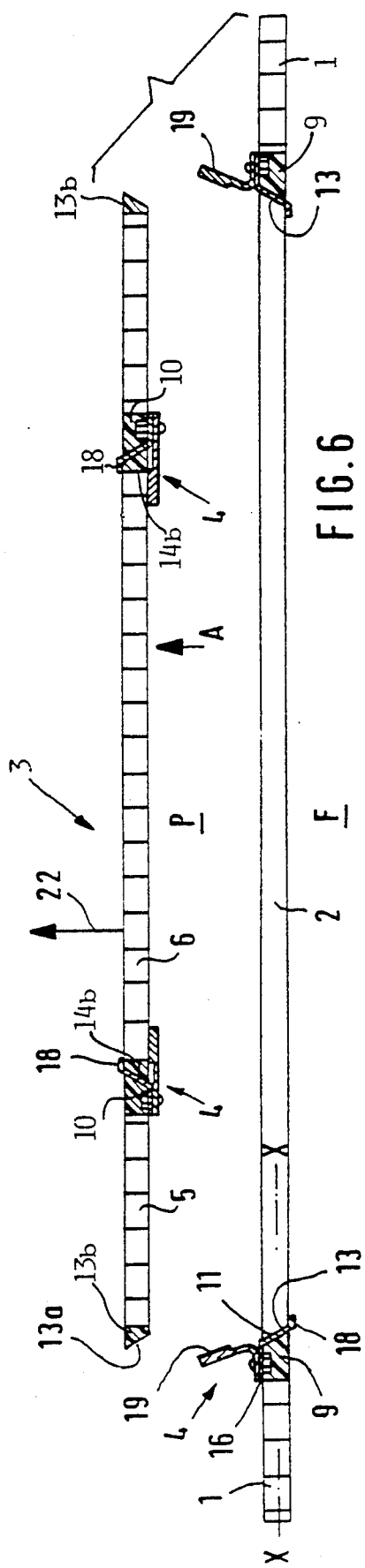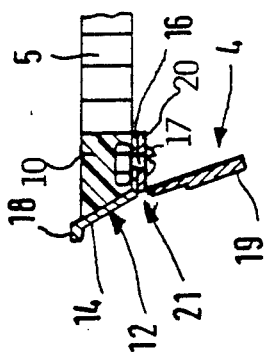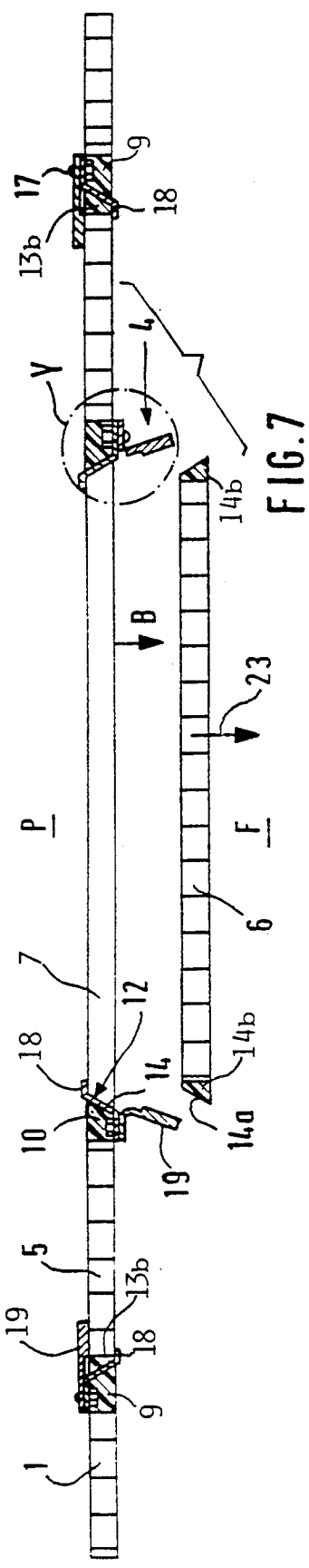

DECOMPRESSION PANEL FOR A SEPARATION DEVICE IN AN AIRCRAFT

FIELD OF THE INVENTION

The invention relates to a decompression panel for use in a separation device, such as a wall section or a floor section, in an aircraft. The separation device separates, for example, a passenger compartment from a freight compartment.

BACKGROUND INFORMATION

Conventionally, such decompression panels are held in respective holes in the separation devices by detachable mounting elements that release the panel in response to a decompression situation to open the decompression hole.

Explosive decompressions may occur in aircraft flying at altitudes where the external atmospheric pressure is noticeably lower than at ground level. Aircraft required to fly at such altitudes must be equipped to provide inside the aircraft body an air pressure corresponding substantially to ground level atmospheric pressure. As a result, a differential pressure exists across the aircraft body wall with the excess pressure prevailing inside the aircraft body.

Conventional aircraft enclose within the aircraft body in addition to a passenger compartment, also a freight compartment. The two compartments are separated by a separation device, such as a separating wall or a separating floor. Additionally, it is known to seal the freight compartment or space by special enclosure walls. It is necessary to provide a decompression equalization system between the two compartments because an explosive decompression would lead to the destruction of the intermediate floor or divider wall and thus also to any installation mounted in these separation devices including control systems.

German Patent Publication (DE-PS) 3,715,328 discloses a pressure equalization system in which openings are provided in the intermediate wall or in the intermediate floor between freight and passenger compartments, and wherein these openings are closed by panel elements held in place by spring clamps. These spring clamps cooperate with flanges that reach around the rim around an opening. The spring clamps are constructed each with two defined breaking locations in such a manner that these locations break in response to a defined pressure difference range. Depending on the decompression direction the decompression panel will be pressed either in the direction of the freight compartment or in the direction of the passenger compartment. Due to the need for two defined breakage locations for each spring clamp, it is difficult to provide a sufficiently precisely defined response characteristic or range for releasing the panels to open the respective opening in response to a defined difference pressure. This is so because the above mentioned flange also exerts certain holding forces.

OBJECTS OF THE INVENTION

In view of the foregoing it is the aim of the invention to achieve the following objects singly or in combination:

to construct the mounting elements for such decompression panels in such a way that a simple construction is combined with a defined response characteristic to different differential pressure ranges;

to assure simultaneously with the precise response characteristic a precise fit between panel sections in an opening to assure an optimal seal under normal operating conditions;

to provide a defined frangible location in each of the mounting elements, whereby such location forms a so-called film hinge; and to use several panels so that one panel is surrounded by another panel with the mounting elements arranged so that one panel can blow out in one direction and two panels together can blow out in the opposite direction.

SUMMARY OF THE INVENTION

The decompression panel according to the invention is characterized in that it is divided into at least two panel sections of which an inner panel section is surrounded by an outer panel section, whereby the outer section forms a frame for the inner section and the dividing device forms a frame for the outermost section. First mounting elements hold the inner panel section in a hole or opening of the outer panel section. Second mounting elements hold the outer panel section in an opening or hole of the dividing device. The mounting elements are provided with frangible locations of reduced cross-sectional area so that in a blow-in situation the inner panel section is blown in one direction, while in a blow-out situation the two panel sections together are blown in an opposite direction. In both situations a sufficient decompression opening is formed in the respective dividing device. The two or more panel sections together do form a complete panel.

The main advantage achieved according to the invention is seen in that the decompression opening formed for a blow-in decompression and the opening formed for a blow-out decompression are opened by the respective panel section or sections so that only one set of mounting elements is affected in each instance. The mounting elements are distributed around the respective panel section and are formed as strap tongues which are effective in one or the other direction, depending on their attachment to their respective rim around the opening in which the respective panel section is received. Each strap tongue has only one release direction, but, depending on its attachment to the rim, it can function in one or the other direction. In both instances, the respective panel section is supported by a supporting flange portion opposite the corresponding strap tongue, whereby the panel sections are held in plane in a form-locking manner due to a slant in a rim forming frame element with which the strap tongues cooperate. The panel sections are provided with respectively slanted rims which bear against the slanted surface of the rim forming frame. In response to a decompression, either one panel section or two panel sections can move in the respective direction by overcoming the holding force of the strap tongues to thereby slip out of the respective opening or decompression hole.

Each strap tongue has, as mentioned, a so-called film hinge formed as a reduced cross-sectional area defining a break location. By properly dimensioning the cross-sectional reduced area of the film hinge, an exact response to a pressure difference is established. The respective strap tongues respond to a decompression explosion by breaking along the film hinge thereby releasing the corresponding panel section or sections. Further, by providing the rim of each panel section and the respective surface area of the opening with matching slants, it is assured that the corresponding panel section or sections can easily move out of the rim surrounding the opening in the required direction, either toward the freight space or toward the passenger space.

BRIEF DESCRIPTION OF THE DRAWINGS

In order that the invention may be clearly understood, it will now be described, by way of example, with reference to the accompanying drawings, wherein:

FIG. 6 is a sectional view similar to that of FIG. 2, however, showing the movement of the decompression panel formed by two sections in a blow-out direction;

FIG. 7 is a view similar to that of FIG. 6, however, showing the inner panel section moving in a blow-in direction; and FIG. 8 is an enlarged view of the detail Y in FIG. 7.

DETAILED DESCRIPTION OF PREFERRED EXAMPLE EMBODIMENTS AND OF THE BEST MODE OF THE INVENTION

Figure 1:
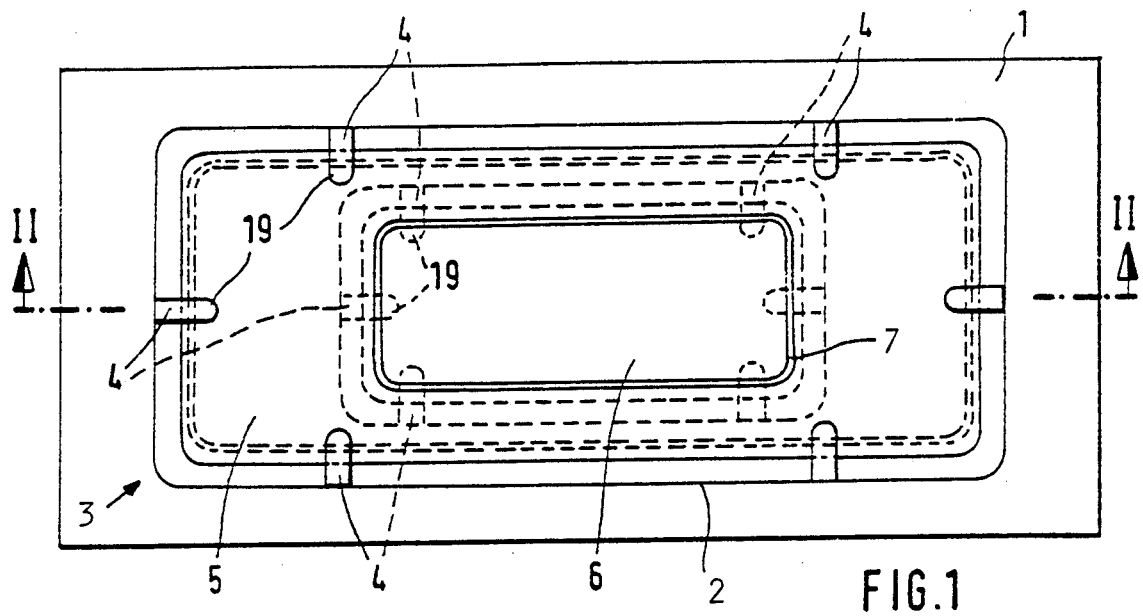
FIG. 1 is a plan view onto a separating device for separating a space in an aircraft into two compartments, whereby the separating device has a decompression opening closed by a decompression panel according to the invention.

FIG. 1 shows a separation device 1 such as a wall section or floor section. A decompression hole 2 in the device 1 is closed by a panel 3 according to the invention. In the shown example, the panel 3 has a first outer panel section 5 fitting into the hole 2 in the device 1 and a second inner panel section 6 fitting into a hole 7 in the outer panel section 5. Under normal operating conditions when there is no decompression, the panels 5,6 are held in place by strap tongues 4 of identical construction. Specifically, the strap tongues 4 hold the outer panel section 5 in the hole 2 and the inner panel section 6 in the hole 7. Thus, the outer panel section 5 surrounds the inner panel section 6 in the plane defined by the device 1.

Figure 2:
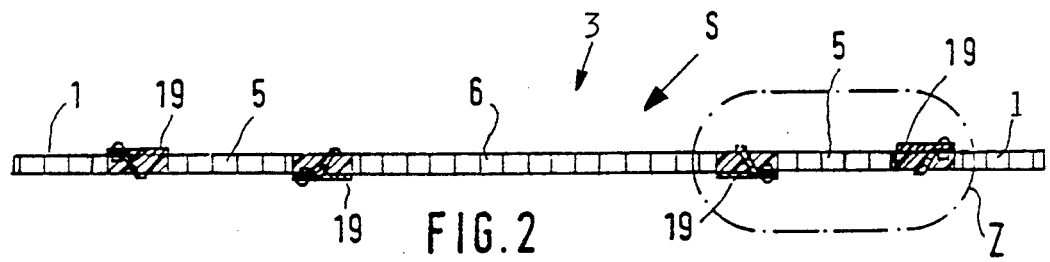
FIG. 2 is a sectional view along section line II—II in FIG. 1.

FIG. 2 shows both panel sections 5 and 6 of the panel 3 in the hole closing position S. In addition, the strap tongues 4 are so arranged on both sides of the panel 3 that the downwardly facing holding tongues 19 permit the release of the inner panel section 6 in a first direction 23, also referred to as the blow-in direction B as shown in FIG. 7. The upwardly facing holding tongues 19 on the other hand, are so arranged that they permit the movement of the entire panel 3, including the outer panel section 5 and the inner panel section 6 in a second direction 22 also referred to as the blow-out direction A shown in FIG. 6. Thus, it is possible to control the direction of blow-in or blow-out simply by the location of the holding tongues 19 on one side or the other side of the panel, as shown in FIG. 2, while using strap tongues 4 of identical construction on both sides of the panel.

Figure 3:
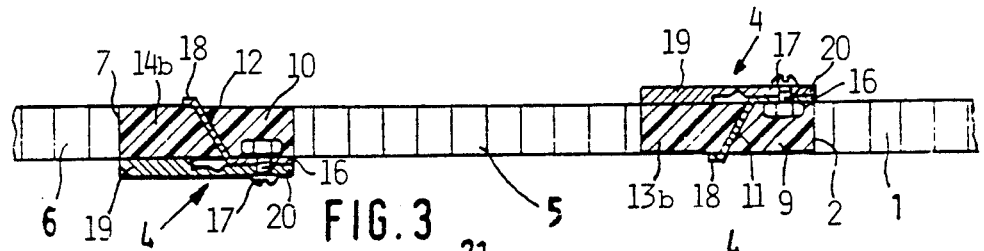
FIG. 3 shows a view similar to that of FIG. 2, but illustrating on an enlarged scale the detail Z of FIG. 2.

FIG. 3 shows the portion Z of FIG. 2 on an enlarged scale to illustrate the construction details. A first sealing rim 14b of elastic material surrounds the inner panel section 6. The bonding between the panel section which may, for example be of honeycomb construction, and the first sealing rim 14b may, for example, be accomplished by an adhesive. The opening 7 in the outer panel section 5 is surrounded by a second sealing rim 10. A first mounting frame 12 is arranged between the sealing rims 14b and 10, as will be described in more detail below.

Figure 4:
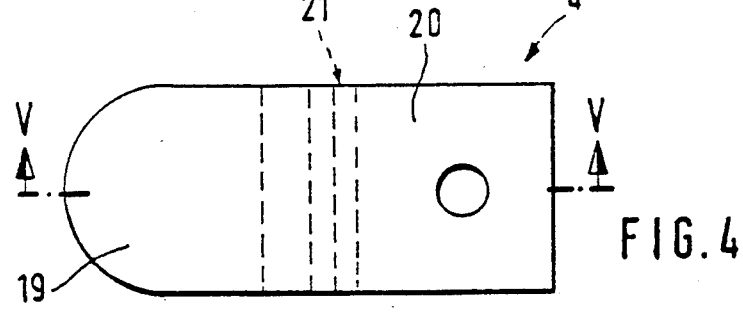
FIG. 4 illustrates a plan view onto a strap tongue according to the invention forming part of a mounting element for the panel sections.
Figure 5:
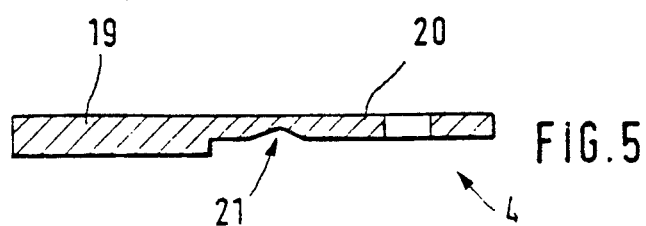
FIG. 5 is a sectional view along section line V—V in FIG. 4.

Referring to FIGS. 3, 4, and 5 in conjunction, each strap tongue 4 has a mounting plate 20 and a holding tongue 19 connected to the plate 20 by a so-called film hinge 21 of reduced cross-section area compared to the cross-section of the plate 20, as viewed in a plane extending perpendicularly to the plane of the drawing through the hinge 21 and also compared to the respective cross-section of the tongue 19. By properly dimensioning the cross-sectional area of the hinge 21, a precise response characteristic to a decompression pressure is established. The frame 12 has a Z-cross-sectional configuration with a slanting central web and a flange at each end. The flange 18 forms a holding or supporting flange while the flange 16 forms a mounting flange portion. As best seen in FIG. 5, the plate 20 is thinner than the holding tongue 19 to provide space for the mounting flange 16. Fastening means, such as nuts and bolts 17, secure the mounting plate 20 of the tongue straps 4 to the respective mounting flange 16 of the corresponding frame member 11 or 12 and also to the respective sealing rim. Specifically, the strap tongues 4 that are intended to break in an upward direction in FIG. 3, are secured to a fourth seal rim 9 while strap tongues that are to break in a downward direction in FIG. 3, are secured to the second seal rim 10. A third seal rim 13b surrounds the outer panel 5 in an outward direction while the second seal rim 10 surrounds the outer panel 5 in an inward direction. The first mentioned seal rim 14b surrounds the inner panel 6 in an outward direction. The fourth sealing rim 9 surrounds the hole 2 in the separating device 1 in an inward direction.

Two frame members 11 and 12 with their Z-cross-section are arranged between the respective seal rims. Thus, frame 11 is arranged between the third seal rim 13b and the fourth seal rim 9. Frame 12 is arranged between the first seal rim 14b and the second seal rim 10, as mentioned.

Referring specifically to FIGS. 6 and 7, the web portion 13 of the frame 11 is slanted toward a passenger space P while the web portion 14 of the frame 12 is slanted toward a freight space F. The cooperating surfaces of the respective seal rims slant to cooperate with the slanting webs. The slanted surface 13a of the seal rim 13b cooperates with the web 13. Similarly, the slanting surface of the rim 9 cooperates with the web 13. The slanting surface 14a of the rim 14b cooperates with the slant of the web 14. Similarly, the slanting surface of the rim 10 cooperates with the slanting web 14. The slanting directions are considered relative to a horizontal plane X—X and are so arranged that supporting and sliding cooperating surface pairs are formed. In FIG. 6, the slants are such that a blow-out A will take place for the entire panel 3 in the direction 22 into a passenger compartment P as mentioned above. On the other hand, in FIG. 7 the cooperating slants are such that a blow-in B will take place in the direction of the arrow 23 into the freight compartment F, whereby only the inner panel section 6 will be blown out of the hole 7 in the outer panel section 5.

The above mentioned slants are further so selected that the panel 3 in the hole closing position S shown in FIG. 2 will assume, with its panel sections 5 and 6, the same horizontal or vertical plane as the separation device 1. The described slants provide a certain wedging action for normally holding the panel or panel sections in place in cooperation with the holding tongues 19. Additionally, the slants facilitate the removal, or rather release of the panel section or sections in the proper direction.

Referring to FIG. 8, which shows on an enlarged scale the detail Y of FIG. 7, it will be noted that the above mentioned hinge 21 is approximately aligned with the edge formed by the slanting web 14 of the frame 12 and the horizontally extending mounting flange portion 16 of the frame 12. By securing the plate 20 and the mounting flange portion 16, to the downwardly facing side of the sealing rim 10, the holding tongue 19 of the strap tongues 4 will break away downwardly as shown in FIG. 8. The nuts for the bolts of the fastening means 17 may be rigidly secured, for example, by adhesive bonding into the respective rim. The supporting flange portion 18 and the flange portion 16 extend in parallel to each other, but in opposite directions away from the slanting web section 14 of the frame 12. The flange portions 18 support the respective panel section 6 so that the panel section 6 cannot be blown out alone in the direction 22, but only in combination with the outer panel section 5. On the other hand, in FIG. 7 the supporting flange portions 18 hold the outer panel section 5 in such a way that the outer panel section 5 will be retained in the separation device 1 so that only the panel section 6 will be able to be released in the direction of the arrow 23.

As mentioned, FIG. 6 illustrates a blow-out situation while FIG. 7 illustrates a blow-in situation. In both instances, the respective holding tongues 19 are either bent and broken away in the upward direction as shown in FIG. 6, or these holding tongues 19 are bent and broken away in the downward direction as shown in FIGS. 7 and 8.

Although the invention has been described with reference to specific example embodiments, it will be appreciated that it is intended to cover all modifications and equivalents within the scope of the appended claims.

What I claim is:

1. A decompression panel for a separation device in an aircraft body, comprising a plurality of panel sections forming together said decompression panel, said panel sections including a central inner panel section and at least one outer panel section surrounding said inner panel section, a first set of mounting means including frangible elements for securing said inner panel section in a first hole of said outer panel section, a second set of mounting means also including frangible elements for securing said outer panel section in a second hole of said separation device, said frangible elements of said first set of mounting means being so arranged that said inner panel section is removable out of said outer panel section in a first direction (23) in response to a respective decompression, said frangible elements of said second set of mounting means being so arranged that said inner panel section and said outer panel section together are removable out of said separation device in a second direction (22) opposite to said first direction in response to a respective decompression.

2. The decompression panel of claim 1, wherein said frangible elements of said first set of mounting means and said frangible elements of said second set of mounting means are of identical construction and arranged to be effective in opposite directions.

3. The decompression panel of claim 1, wherein said first set of mounting means comprise a first frame member (12) surrounding said first hole (7) in said outer panel section, said first frame member (12) having a web section (14) slanting in a direction to permit removing said inner panel section (6) in said first direction (23), and wherein said second set of mounting means comprise a second frame member (11) surrounding said second hole (2) in said separation device (1), said second frame member (11) having a web section (13) slanting in a direction to permit removing said outer panel section (5) and inner panel section (6) in said second direction (22).

4. The decompression panel of claim 3, further comprising a first sealing rim (14b) surrounding said inner panel section (6), said first sealing rim (14b) having a slanting surface to match said slanting web section (14) of said first frame member (12).

5. The decompression panel of claim 4, further comprising a second sealing rim (10) surrounding said first hole (7) in said outer panel section (5), said second sealing rim (10) also having a slanting surface to match said slanting web section (14) of said first frame member (12), whereby said first frame member (12) is held in a sealed manner between said first and second sealing rims.

6. The decompression panel of claim 3, further comprising a third sealing rim (13b) surrounding said outer panel section (5), said third sealing rim (13b) also having a slanting surface to match said slanting web section (13) of said second frame member (11).

7. The decompression panel of claim 6, further comprising a fourth sealing rim (9) surrounding said second hole (2) in said separation device (1), said fourth sealing rim (9) also having a slanting surface to match said slanting web section (13) of said second frame member (11), whereby said second frame member (11) is held in a sealed manner between said third and fourth sealing rims (13b, 9).

8. The decompression panel of claim 3, wherein said slanting web section (14) of said first frame member (12) and a respective slanting outer surface (14a) of said inner panel section (6) form cooperating sliding and support surfaces which slant against a blow-in direction (B) which is said first direction (23) to permit said removing of said inner panel section (6) in said blow-in direction (B).

9. The decompression panel of claim 3, wherein said slanting web section (13) of said second frame member (11) and a respective slanting outer surface (13a) of said outer panel section (5) form cooperating sliding and support surfaces which slant against a blow-out direction (A) which is said second direction (22) to permit said removing of said outer panel section in said blow-out direction.

10. The decompression panel of claim 3, wherein each of said first frame member (12) and said second frame member (11) has a Z-cross-sectional configuration, wherein said web sections (13, 14) form a slanting Z-web (13, 14), said Z-cross-sectional configuration having a supporting flange portion (18) and a mounting flange portion (16) extending in parallel to each other, but in opposite directions away from said Z-web (13, 14), said frangible elements of said first and second mounting means comprising strap tongues (4) each having a mounting plate 20, a holding tongue (19) and a frangible hinge (21) interconnecting said mounting plate (20) with its holding tongue (19), and wherein each panel section (5, 6) is normally held between said holding tongues (19) on one side of the panel sections and a respective supporting flange portion (18) on the other side of said panel sections (5, 6).

11. The decompression panel of claim 10, wherein said strap tongues (4) are connected to said mounting flange portion (16) of the respective frame member in such positions that said frangible hinge (21) is aligned with a line located where said mounting flange portion (16) of said frame members merges into the respective Z-web, whereby said holding tongues (19) can break away along said frangible hinge (21) in response to a decompression for releasing the respective panel section in the appropriate direction to open the corresponding hole.

12. The decompression panel of claim 10, wherein said frangible hinge (21) is constructed as a so-called film hinge which has a reduced cross-sectional surface area compared to said mounting plate (20) and said holding tongue (19), said reduced cross-sectional surface area providing a defined holding strength for normally holding the respective panel section in a hole closing position, said holding strength being insufficient to withstand a decompression, whereby said film hinge breaks to release the panel section.

13. The decompression panel of claim 3, wherein said first direction (23) is a blow-in direction (B), and wherein said slanting web section (14) slants toward a freight compartment (F), whereby said inner panel section (6) is blown into said freight compartment.

14. The decompression panel of claim 3, wherein said second direction (22) is a blow-out direction (A), and wherein said slanting web section (13) of said second frame member slants toward a passenger compartment (P), whereby said inner panel section (6) and said outer panel section (5) together are blown out into said passenger compartment.

* * * * *